United States Patent
Liu et al.

(10) Patent No.: US 11,202,995 B2
(45) Date of Patent: Dec. 21, 2021

(54) SUPPORTED CARBON MOLECULAR SIEVE MEMBRANES AND METHOD TO FORM THEM

(71) Applicant: Dow Global Technologies LLC, Midland, MI (US)

(72) Inventors: Junqiang Liu, Midland, MI (US); Janet M. Goss, Midland, MI (US); Stephanie K. Anderson, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 194 days.

(21) Appl. No.: 16/621,433

(22) PCT Filed: Apr. 12, 2018

(86) PCT No.: PCT/US2018/027217
§ 371 (c)(1),
(2) Date: Dec. 11, 2019

(87) PCT Pub. No.: WO2018/231335
PCT Pub. Date: Dec. 20, 2018

(65) Prior Publication Data
US 2021/0138407 A1 May 13, 2021

Related U.S. Application Data

(60) Provisional application No. 62/520,171, filed on Jun. 15, 2017.

(51) Int. Cl.
*B01D 53/22* (2006.01)
*B01D 69/10* (2006.01)
(Continued)

(52) U.S. Cl.
CPC ............. *B01D 69/10* (2013.01); *B01D 69/12* (2013.01); *B01D 71/021* (2013.01); *B01D 71/30* (2013.01); *B01D 2325/04* (2013.01)

(58) Field of Classification Search
CPC ...... B01D 71/30; B01D 71/021; B01D 69/10; B01D 69/12; B01D 2325/04
See application file for complete search history.

(56) References Cited

U.S. PATENT DOCUMENTS

| 6,077,401 A * | 6/2000 | Fields | B82Y 40/00 204/157.47 |
| 10,661,304 B2 * | 5/2020 | Roberts | B05D 1/02 |

(Continued)

OTHER PUBLICATIONS

International Search Report and Written Opinion pertaining to PCT/US2018/027217 dated Jun. 29, 2018.

(Continued)

*Primary Examiner* — Anthony R Shumate
(74) *Attorney, Agent, or Firm* — Dinsmore & Shohl LLP

(57) ABSTRACT

A supported carbon molecular sieve (CMS) membrane is made by contacting a film of a carbon forming polymer on a polymer textile to form a laminate. The laminate is then heated to a temperature for a time under an atmosphere sufficient to carbonize the film and polymer textile to form the supported CMS membrane. The supported CMS membrane formed is a laminate having a carbon separating layer graphitically bonded to a carbon textile, wherein the carbon separating layer is a continuous film. The supported CMS membranes are particularly useful for separating gases such as olefins from their corresponding paraffins.

15 Claims, 2 Drawing Sheets

(51) Int. Cl.
*B01D 69/12* (2006.01)
*B01D 71/02* (2006.01)
*B01D 71/30* (2006.01)

(56) References Cited

U.S. PATENT DOCUMENTS

| | | | | |
|---|---|---|---|---|
| 2005/0087491 | A1* | 4/2005 | Hennige | B01D 69/141 210/640 |
| 2012/0040581 | A1* | 2/2012 | Kim | D06M 11/00 442/330 |
| 2012/0223014 | A1* | 9/2012 | Boam | B01D 61/28 210/644 |
| 2013/0177823 | A1* | 7/2013 | Nguyen | H01M 8/0625 429/411 |
| 2014/0199483 | A1* | 7/2014 | Roy | B01D 69/10 427/244 |
| 2015/0270522 | A1* | 9/2015 | Yamada | H01M 50/449 429/145 |
| 2016/0362803 | A1* | 12/2016 | Zeng | C25B 1/13 |
| 2017/0203276 | A1* | 7/2017 | Liu | B01D 53/02 |
| 2019/0382269 | A1* | 12/2019 | Askari | C08J 5/06 |
| 2020/0171418 | A1* | 6/2020 | Rezaei | B01D 39/1623 |
| 2020/0206696 | A1* | 7/2020 | Ma | B01D 67/0067 |

OTHER PUBLICATIONS

Bhave, R., "Inorganic Membranes Synthesis, Characteristics and Applications", 2012, Springer Science & Business Media.
Centeno et al., "Carbon Molecular Sieve Gas Separation Membranes Based on Poly(Vinylidene Chloride-co-vinyl Chloride", Carbon, 2000, pp. 1067.
Damle et al., "Carbon Membranes for Gas Separation: Developmental Studies", Gas Separation & Purification, 1994, pp. 137.
Ismail et al., "Review on the Development of Defect-Free and Ultrathin-Skinned Asymmetric Membranes for Gas Separation through Manipulation of Phase Inversion and Rheological Factors", J. Appl. Polymer Sci., 2003, vol. 88, 442-451.
Rao et al., "Nanoporous Carbon Membranes for Separation of Gas Mixtures by Selective Surface Flow", J Membr Sci. 1993, 85(3):253-64.
Tanco et al., "Recent Advances on Carbon Molecular Sieve Membranes (CMSMs) and Reactors", Processes, 2016, 2-21.
Zhang et al., "Optimizing the Synthesis of Composite Polyvinylidene Dichloride-Based Selective Surface Flow Carbon Membranes for Gas Separation", J Membr Sci. 2011, 369(1-2):243-9.

* cited by examiner

SUPPORTED CARBON MOLECULAR SIEVE MEMBRANES AND METHOD TO FORM THEM

CROSS REFERENCE TO RELATED APPLICATIONS

This application is a National Stage Entry under 35 U.S.C. 071 of International Patent Application No. PCT/US2018/027217 filed Apr. 12, 2018, which claims the benefit of U.S. Provisional Patent Application No. 62/520,171, filed Jun. 15, 2017 which are hereby incorporated by reference in their entirety.

FIELD OF THE INVENTION

The invention relates to carbon molecular sieve (CMS) membranes for use in gas separation and method to make them. In particular the invention relates to CMS membranes supported by carbon textiles and method to make them

BACKGROUND OF THE INVENTION

Membranes are widely used for the separation of gases and liquids, including for example, separating acid gases, such as $CO_2$ and $H_2S$ from natural gas, and the removal of $O_2$ from air. Gas transport through such membranes is commonly modeled by the sorption-diffusion mechanism. Currently, polymeric membranes are well studied and widely available for gaseous separations due to easy process-ability and low cost. CMS membranes, however, have been shown to have attractive separation performance properties exceeding that of polymeric membranes.

Carbon molecular sieves (CMS) and CMS membranes have been used to separate gases. CMSs may be prepared from a variety of resins, but commonly are a polyimide or polyvinylidene chloride copolymers, that are pyrolyzed at various temperatures and/or under various conditions. The pyrolysis reduces the resins to carbon, but maintains at least some porosity, in the form of pores less than 1 micrometer and typically on the order of nanometers, in the pyrolyzed product. The CMSs thus formed may then be employed in conventional gas separations equipment employing adsorption of particular gases, such as packed beds, columns, and the like, where the pore size determines which gas in a gas mixture is adsorbed and which is not. Adsorption and desorption techniques may be alternated to carry out the separation, according to, for example, conventional pressure swing or temperature swing adsorption methods.

Preferably though, the CMS membranes have been used to separate gases by flowing gas mixtures through the CMS membranes. Because it is necessary to have sufficient gas flow (permeance) to be commercially practical, the separating layer needs to be thin (typically less than 25 micrometers or thinner). Supported membranes have been formed, for example, by casting a film of the polymer onto a support that can survive the pyrolysis conditions such as a ceramic, T. A. Centeno, et al., "Molecular sieve gas separation membranes based on poly(vinylidene chloride-co-vinyl chloride)," Carbon (2000) 38, 1067-1073, or asymmetric membranes formed by phase inversion. Phase inversion involves the quenching of a multicomponent solution comprised of solvent and dissolved resin into a coagulant, which is miscible with the solvents, but not the resin. Due to phase instability arising from the counter diffusion of the solvents and non-solvents for the resin, an asymmetric structure results (see, for example, A. F. Ismail and L. P. Yean, J. Appl. Polymer Sci. Vol. 88, 442-451 (2003)). The utilization of a ceramic as the support or use of phase inversion processes are more prone to having defects in the thin separating polymer cast film and subsequent CMS layer formed therefrom. For example, a ceramic will be expanding during pyrolysis of the polymer film as it is contracting causing tensile stresses that may cause defects to form. Likewise, when phase inversion is used to form an asymmetric polymeric film, due to the inherent phase instability there may also be defects formed in the polymeric layer corresponding to the CMS separating layer.

It would be desirable to provide a method to make a carbon molecular sieve that avoids one or more of the aforementioned problems (e.g., reduction of defects within the separating layer).

SUMMARY OF THE INVENTION

A method of making a supported carbon molecular sieve membrane,
(i) forming laminate of a film of a carbon forming polymer in contact with a polymer textile to form a laminate;
(ii) heating the laminate to a carbonization temperature for a time under an atmosphere sufficient to carbonize the film and polymer textile to form the supported carbon molecular sieve membrane comprised of a separating carbon layer supported on a carbon textile layer.

The method of the invention enables the formation of supported CMS membranes that are thin while avoiding defects arising, for example, from stresses during pyrolysis or defects from solvent diffusion or evaporation when forming the polymer layer that becomes the carbon separating layer upon pyrolysis. In a particular embodiment the carbon forming polymer has a similar or same chemistry as the polymer textile.

A second aspect of the invention is a supported carbon molecular sieve membrane comprised of a laminate having a carbon separating layer graphitically bonded to a carbon textile, wherein the carbon separating layer is a continuous film.

A third aspect of the invention is a process for separating a gas molecule from a gas feed comprised of the gas molecule and at least one other gas molecule comprising
(i) providing the supported carbon molecular sieve membrane of second aspect; and
(ii) flowing the gas feed through said carbon molecular sieve membrane to produce a first stream having an increased concentration of the gas molecule and a second stream having an increased concentration of the other gas molecule.

The supported CMS membrane of the invention may be used to make a gas separating module comprised of: a plurality of the supported CMS membranes contained within a sealable enclosure having an inlet for introducing a gas feed comprised of at least two differing gas molecules wherein said gas feed flows through said membranes such that the gas is separated into a permeate gas stream and a retentate gas stream; a first outlet for permitting egress of a permeate gas stream; and a second outlet for egress of a retentate gas stream.

The gas separation method is useful for separating gas molecules in gas feeds that have very similar molecular sizes such as hydrogen/ethylene, ethane/ethylene and propane/propylene. It may also be used to separate gases from atmospheric air such as oxygen or separating gases (e.g., methane) in natural gas feeds.

DETAILED DESCRIPTION OF THE INVENTION

Figure 1:
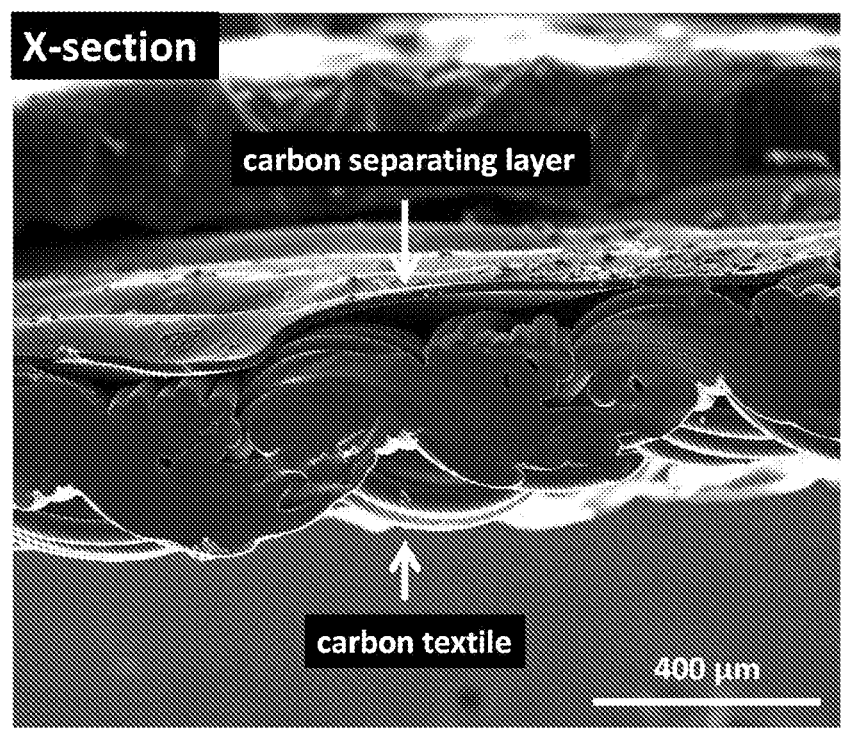
FIG. 1 is a scanning electron micrograph of the cross section of a supported CMS membrane of this invention.
Figure 2:
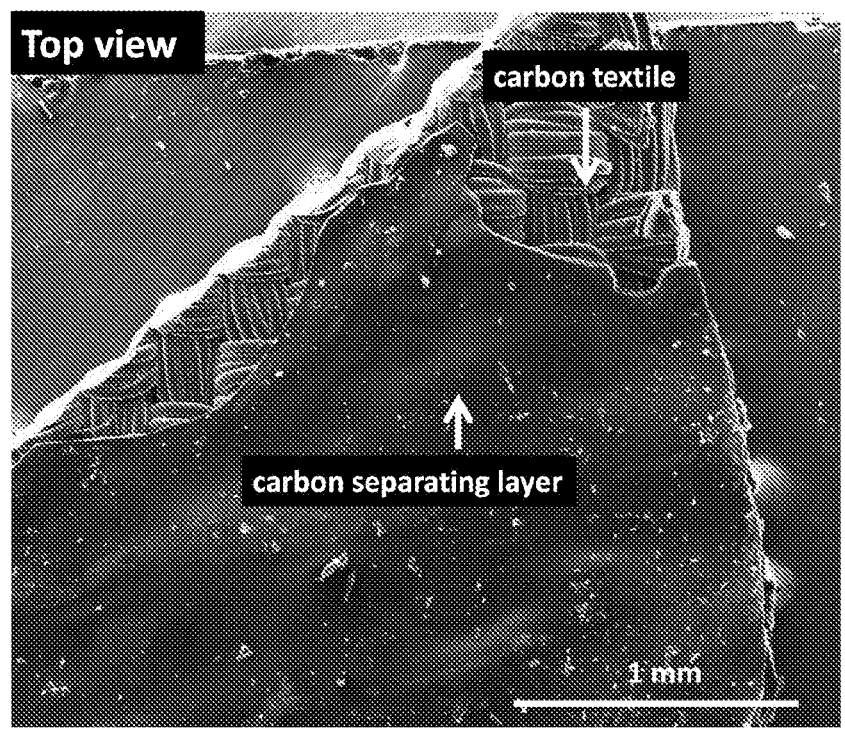
FIG. 2 is a scanning electron micrograph of the top view of a supported CMS membrane of this invention.

The supported carbon molecular sieve (CMS) membrane of this invention is made by contacting a film of a carbon forming polymer with a polymer textile to form a laminate. The textile may be any type of textile with it being understood that the textile has macro-porosity between the filaments making up the textile before pyrolysis and after pyrolysis to form a carbon textile support. The textile illustratively may be woven, knitted, crocheted, spread towed, braided, macramed, felted or any combination thereof. The textile desirably is woven or felted. The filaments may be any suitable diameter or shape such as those known in the art, but typically may range from 5 or 10 micrometers to several hundred micrometers, but typically is less than about 100 micrometers.

The carbon forming polymer and porous polymer textile may be any useful polymer for making a gas separation membrane or textile that desirably fuse together and carbonize upon heating sufficiently. Desirably the polymer that forms the separating layer that is supported by the carbon textile layer and the textile polymer have similar or the same chemistry. Similar herein may mean that the chemistry is the same but the two polymers may have differing molecular weights averages such weight average molecular weight (Mw). Likewise, the polymers may have similar chemistries, but not exactly the same chemistries, for example, they both may be a PVDC copolymer where the comonomer is the same, but present in differing concentrations or the comonomer is different. In a preferred embodiment, the polymers used to make textile and separating layer have similar behavior upon heating to carbonize to form the supported carbon molecular sieve membrane and the polymers at least partially fuse where they are in contact. Desirably, the polymers upon heating undergo expansion and contraction at the same temperatures in essentially the same manner. Illustratively, the polymers both crosslink, go through the glass transition or carbonize at the same or nearly the same (within a 5 to 10 degrees C.) temperature with similar coefficients of shrinkage or expansion as the case may be.

Desirably the polymer used for either the carbon forming polymer or polymer forming the textile is a polyimide or PVDC copolymer. The PVDC copolymer may be any useful copolymer of vinylidene chloride monomer and at least one additional comonomer. The comonomer may be selected from a variety of materials, including, in particular embodiments, a vinyl monomer, vinyl chloride monomer, an acrylate monomer, a methacrylate monomer, a styrenic monomer, acrylonitrile, methacrylonitrile, itaconic acid, chlorotrifluoroethylene, and combinations thereof. In more particular embodiments examples of the vinyl monomers include vinyl chloride, vinyl acetate, acrylonitrile, and combinations thereof. More particular examples of the acrylate monomers include methyl acrylate, ethyl acrylate, butyl acrylate, and combinations thereof. More particular examples of methacrylate monomers include methyl methacrylate, butyl methacrylate, and combinations thereof. A more particular example of styrenic monomers is styrene itself.

It is preferred that the vinylidene chloride based copolymer, which is herein termed a polyvinylidene chloride (PVDC) copolymer, includes at least 60 wt % of vinylidene chloride, based on total weight of the copolymer, and in more preferred embodiments at least 70 wt %. However, it is further desired that the PVDC contains a maximum of 97 wt % vinylidene chloride, and thus preferably contains a minimum of at least 3 wt % of the comonomer or comonomer combination; more preferably from 3 wt % to 40 wt %; still more preferably from 3 wt % to 30 wt %; and most preferably from 3 wt % to 20 wt %.

Particular embodiments of PVDCs that are suitable for use in the invention are those including as a comonomer an acrylate, such as methyl acrylate, ethyl acrylate, butyl acrylate, or a combination thereof, in an amount from 3 wt % to 20 wt %, based on the weight of the PVDC as a whole; more preferably from 3.5 wt % to 15 wt %; and most preferably from 4 wt % to 12 wt %. Another particular embodiment is a PVDC including vinyl chloride in an amount from 3 wt % to 30 wt %; more preferably from 7 wt % to 28 wt %; and most preferably from 9 wt % to 25 wt %.

It is also preferred that the overall weight average molecular weight (Mw) of the PVDC copolymer ranges from 10,000 to 250,000; more preferably from 50,000 to 200,000; and most preferably from 60,000 to 150,000.

Use of additives in the PVDC copolymer is also contemplated as being within the scope of the invention. Common additives may include, but are not necessarily limited to, epoxidized oil stabilizers such as epoxidized soybean oil, epoxidized linseed oil, and the diglycidyl ether of bisphenol A. Also frequently employed are liquid plasticizers such as aliphatic and aromatic esters, including for example dibutyl sebacate, acetyl tributyl citrate, dioctyl phthalate, and the like, and combinations thereof. Other common additives may include lubricants, such as polyethylene wax, paraffin wax, oxidized polyethylene wax, and combinations thereof. Lubricants may optionally be included, and may comprise, for example, high density polyethylene, acrylate copolymers and silicone polymers, and combinations thereof. Another group of additives that may be included are acid scavengers such as epoxy compounds, magnesium hydroxide, magnesium oxide, tetrasodium pyrophosphate, calcium phosphate, magnesium phosphate, DHT 4A (a synthetic hydrotalcite-like halogen scavenger available from Kyowa Chemical Industry), calcium oxide, calcium carbonate, and combinations thereof. Antioxidants such as phenolics may also be incorporated. Combinations of any or all of these types of additives may be included in the PVDC.

It is preferred that the total amount of all additives combined be no more than 15 wt %, and more preferably no more than 8 wt % or 3 wt %. In many applications, however, an amount of all additives combined of at least 2 wt % may be typical, with use thereof therefore ranging preferably from 2 wt % to 8 wt %, and more preferably from 2 wt % to 3 wt %. Those skilled in the art will be aware of the use of such additives and their indications and contraindications without further direction herein.

Those skilled in the art will also be aware of a variety of means and methods for preparing copolymers. However, in general any of the typical or conventional methods of polymerization, including but not limited to mass polymerization, suspension polymerization, and emulsion polymerization, and preferably suspension polymerization or emulsion polymerization, may be employed. It is generally preferred that polymerization is carried out at a temperature that ensures avoidance of degradation of all of the PVDC components, e.g., preferably from 10° C. to 120° C.; more preferably from 20° C. to 100° C.; and most preferably from 30° C. to 90° C.

It has been discovered that it is useful for the PVDC copolymer that is used to form the film to have a crystallinity that generally ranges from 25% to 85% of the resin or formed film, as measured by differential scanning calorimetry (DSC) according to ASTM D3418. The range of crystallinity typically allows for the desired carbon film traits to be realized. It is more preferred that this level ranges from 40% to 80%, and most preferred that this level ranges from 50%, 55% or even 60% to 75%. Thus, inclusion of a comonomer generally helps to reduce the crystallinity to ensure the desired range, and also to increase the dissolution and thereby improve processability when casting a film on the textile, but too much may lead to undesirably long dehydrochlorination times during the thermal treatment below the PVDC copolymer melting temperature. In general, inclusion of bulkier monomers may tend to reduce overall copolymer crystallinity by a greater amount than inclusion of less bulky monomers. Thus, for example, butyl acrylate will tend to reduce crystallinity more than, for example, methyl acrylate or ethyl acrylate, assuming such is/are used in the same mole percent (mol %) based on final copolymer composition.

The polyimide polymer may be any useful polyimide polymer for making CMS membranes. The polyimide may be a conventional or fluorinated polyimide. Desirable polyimides typically contain at least two different moieties selected from 2,4,6-trimethyl-1,3-phenylene diamine (DAM), oxydianaline (ODA), dimethyl-3,7-diaminodiphenyl-thiophene-5,5'-dioxide (DDBT), 3,5-diaminobenzoic acid (DAB A), 2,3,5,6-tetramethyl-1,4-phenylene diamine (durene), meta-phenylenediamine (m-PDA), 2,4-diaminotoluene (2,4-DAT), tetramethylmethylenedianaline (TMMDA), 4,4'-diamino 2,2'-biphenyl disulfonic acid (BDSA); 5,5'-[2,2,2-trifluoro-1-(trifluoromethyl)ethylidene]-1,3-isobenzofurandion (6FDA), 3,3',4,4'-biphenyl tetracarboxylic dianhydride (BPDA), pyromellitic dianhydride (PMDA), 1,4,5,8-naphthalene tetracarboxylic dianhydride (NTDA), and benzophenone tetracarboxylic dianhydride (BTDA), with two or more of 6FDA, BPDA and DAM being preferred.

A particularly useful polyimide, designated as 6l-DA/BPDA-DAM, may be synthesized via thermal or chemical processes from a combination of three monomers: DAM; 6FDA, and BPDA, each commercially available for example from Sigma-Aldrich Corporation. Formula 1 below shows a representative structure for 6FDA/BPDA-DAM, with a potential for adjusting the ratio between X and Y to tune polymer properties. As used in examples below, a 1:1 ratio of component X and component Y may also abbreviated as 6FDA/BPDA (1:1)-DAM.

A second particularly useful polyimide, designated as 6FDA-DAM lacks BPDA such that Y equals zero in Formula 1 above. Formula 2 below shows a representative structure for this polyimide.

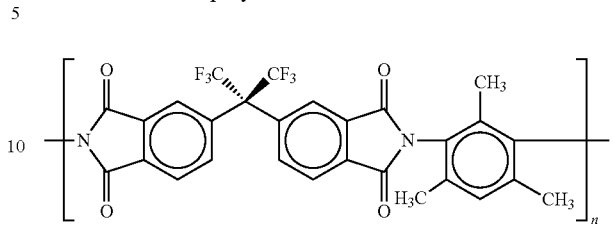

Formula 2. Chemical structure of 6FDA-DAM

A third useful polyimide is MATRIMID™ 5218 (Huntsman Advanced Materials), a commercially available polyimide that is a copolymer of 3,3',4,4'-benzo-phenonetetracarboxylic acid dianhydride and 5(6)-amino-1-(4'-aminophenyl)-1,3,3-trimethylindane (BTDA-DAPI).

The polymer film that forms the carbon film upon carbonization may be made by any suitable process such as those known in the art. Exemplary methods include casting from a solution, melt extrusion or stretching of the polymer to form a film. Illustratively, the film may be a PVDC copolymer that has been stretched via a commercial double bubble process. Fibers may be made by any suitable method such as those known in the art including for example melt or solution spinning to form the fibers.

The laminating of the polymer film onto the polymer textile may be by any suitable method. For example, the film may be cast directly onto the textile, which may be followed by heating to remove any solvent and fuse the film to the textile for ease of handling. In a preferred embodiment the film is hot rolled onto the textile at a temperature that fuses the film to the textile. The temperature to hot roll or fuse the polymer film to the polymer textile may be any useful temperature or pressure to form the desired laminate and is dependent on the particular polymers used. Typical temperatures may range from 100 to 500 degrees C. The time at the temperature or pressure is also dependent on the polymers used and may range for several seconds to any practicable time (e.g., 60 minutes).

The heating to carbonize the polymer film and polymer textile may be performed at any temperature sufficient to carbonize the polymers to form the supported carbon molecular sieve membrane. Likewise the atmosphere is one that carbonizes the polymer film and textile and generally is one that is essentially devoid of oxygen, (less than 100 ppm) with nitrogen, inert gasses, vacuum or combinations thereof being useful. In a particular embodiment, the polymer film and textile is a PVDC copolymer that is first heated to a pretreatment temperature of 100° C. to 180° C. to form a pretreated polyvinylidene chloride copolymer. The pre-

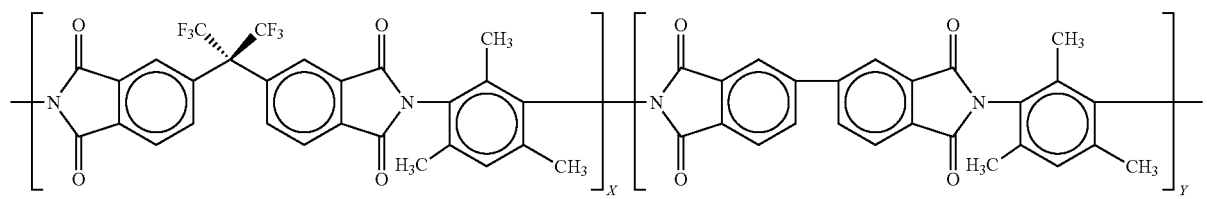

Formula 1. Chemical structure of 6FDA/BPDA-DAM treated PVDC is then further heated to a pyrolysis temperature from 350° C. to 1700° C., with the range preferably being from 400° C. to 1000° C. Likewise, in another embodiment, the polymer film and textile are a polyimide and the temperature is desirably from 400° C. to 1000° C., without any pretreatment temperature. The heating rate and cooling rate may be any practicable, but generally is from 1 to 20° C./minute heating or cooling, with it being understood that the rate may change during the heating and cooling. In particular, it may be advantages to cool faster initially from the carbonization temperature such as up to 200° C./minute initially with the cooling rate becoming less as the temperature approaches room temperature.

Generally the pre-treatment is used to stabilize, or "lock," the copolymer structure prior to carbonization thereof. In this step the PVDC film and textile are heated, below the melting temperature thereof (typically less than about 180° C., depending upon the exact composition of the precursor), in order to dehydrochlorinate the film to the extent of at least 10%. As used herein, the term "at least 10% dehydrochlorinated" means that the film or textile has been pre-treated, by removing hydrogen chloride, to a point at which the PVDC copolymer film or fiber no longer melts and, in fact, begins to become infusible. It is well-accepted in the art that such a change in molecular kinetics begins to occur at a point of approximately 10% dehydrochlorination and is completed or maintained as the level of dehydrochlorination increases above that point. This step is termed a "pre-treatment" because it occurs prior to a pyrolysis step, which is the treatment step wherein carbonization is accomplished.

During the pre-treatment the copolymer structure's temperature is preferably maintained in a range of from 100° C. to 180° C., more preferably from 120° C. to 160° C., and most preferably from 130° C. to 150° C. This is preferably done in air for convenience, but other atmospheres, such as $N_2$ and other inert gases or oxidizing gases such as $CO_2$, or combinations thereof, may also or alternatively be used, since generally only minor levels of oxidation of the copolymer are anticipated within the overall given temperature range. Achievement of the desired dehydrochlorination, that is responsible for the formation of the locked structure, may be accomplished by exposure to a source of high energy irradiation, such as gamma rays, an electron beam, ultraviolet light, or a combination thereof. The time may vary from 1 hour (hr) to 48 hr, preferably from 1 hr to 24 hr, and most preferably from 1 hr to 12 hr, as needed to reach at least 10% dehydrochlorination point, at which the copolymer begins to become infusible, i.e., no longer able to be melted. The dehydrochlorination degree can vary from 5% to 100%, depending upon pretreatment temperature and time. Where more than visual confirmation of the beginning of infusibility is desired, additional confirmation of the percentage of dehydrochlorination may be obtained by means of, for example, Thermo Gravimetric Analysis (TGA), using standard and well-known methods and equipment.

During the pre-treatment the film and textile (laminate) may be restrained to maintain its shape and desirably is. The particular restraining method may be any known in the art and may be held in tension or compression. In a particular embodiment, they are restrained by applying a compressive force. In particular the laminate is placed between two flat substrates that may be impervious or pervious to gases including the HCl being removed. Illustratively, the laminate may be constrained between two low surface energy plates (e.g., TEFLON plates or sheets), which are further interposed between two metal, ceramic or graphite plates. Alternatively, the plates may be pervious to gases such as the HCl being removed such as honeycomb structures. The amount of tension or compression may be any useful amount, but typically may range from 0.01 MPa to 10 MPa, from 0.1 to 1 MPa, or from 0.1 to 0.5 MPa. In the same manner, the restraining during pyrolysis may be performed in the same fashion with similar substrates, which can withstand the maximum pyrolysis temperatures used.

Following the dehydrochlorination pre-treatment, the pre-treated laminate is pyrolyzed. As already pointed out hereinabove, this pyrolysis is also termed "carbonization," because the result thereof is that the polymers of the film and textile are is converted to the carbon-only, or near carbon-only, skeleton of its polymer structure, i.e., all or virtually all atoms other than carbon have been removed, but the carbon-carbon bonds remain substantially intact, and the CMS may now be termed to be "carbonaceous." The pyrolysis may be carried out using any means generally known to those skilled in the art, but may be carried out at an attained maximum temperature within the range of from 350° C. to 1700° C. Desirably, the temperature is at least 400° C., 450° C. to at most 1200° C., 1000° C., 700° C., 650° C., 600° C. or 550° C.

The atmosphere during the carbonization may be any useful for forming the carbon molecular sieve membranes. Exemplary atmospheres include any non-oxidizing gas such as nitrogen, an inert gas (e.g., noble gas), vacuum (e.g. less than 0.1 millibar) or combinations thereof. The atmosphere may be varied during the heating and may include small amounts of oxygen as described below. In one embodiment the pyrolysis utilizes a controlled purge gas atmosphere during pyrolysis in which low levels of oxygen are present in an inert gas. By way of example, an inert gas such as argon is used as the purge gas atmosphere. Other suitable inert gases include, but are not limited to, nitrogen, helium, or any combinations thereof. By using any suitable method such as a valve, the inert gas containing a specific concentration of oxygen may be introduced into the pyrolysis atmosphere. For example, the amount of oxygen in the purge atmosphere may be less than about 50 ppm (parts per million) O2/Ar. Alternatively, the amount of oxygen in the purge atmosphere may be less than 40 ppm $O_2$/Ar. Embodiments include pyrolysis atmospheres with about 8 ppm, 7 ppm, or 4 ppm $O_2$/Ar during a portion or the entire time of the heating.

In a particular embodiment, the supported carbon molecular sieve has a separating carbon layer that is from about 0.01 micrometer, 0.1 micrometer or 1 micrometer to 20 micrometers 15 micrometers or 10 micrometers in thickness. The length and width of the separating carbon layer is continuous. Continuous meaning that there is essentially no defects that allows the passage of the gas molecules to pass without passing through a portion of the microstructural porosity of the separating carbon layer itself. It is understood that there may be some defects within the separating carbon layer, but not so many that it deleteriously affects the separating ability of the separating carbon layer.

The carbon textile layer may be anything thickness so long as it is macroporous allowing the free flow of gas through a portion of the carbon textile layer. Macroporous means that there are pores traversing the thickness of the textile that are at least an order of magnitude larger than the gas molecule to be separated and typically the textile is at least 30% porous and desirably 40% or 50% porous or more.

The supported CMS membranes are particularly suitable for separating gases that are similar in sizes such as described previously and involve flowing a gas feed containing a desired gas molecule and at least one other gas molecule through the membrane. The flowing results in a first stream have an increased concentration of the desired gas molecule and second stream having an increased concentration of the other gas molecule. The process may be utilized to separate any number of gas pairs and in particular is suitable for separating hydrogen from ethylene, ethane, propylene, propane or mixture thereof or hydrogen from any low molecular weight hydrocarbon, nitrogen, oxygen, $CO_2$ or air. When practicing the process, the membrane is desirably fabricated into a module comprising a sealable enclosure comprised of a plurality of supported CMS membranes within the sealable enclosure. The sealable enclosure having an inlet for introducing a gas feed comprised of at least two differing gas molecules; a first outlet for permitting egress of a permeate gas stream; and a second outlet for egress of a retentate gas stream.

The gas permeation properties of a membrane can be determined by gas permeation experiments. Two intrinsic properties have utility in evaluating separation performance of a membrane material: its "permeability," a measure of the membrane's intrinsic productivity; and its "selectivity," a measure of the membrane's separation efficiency. One typically determines "permeability" in Barrer (1 Barrer=$10^{-10}$ [cm$^3$ (STP) cm]/[cm$^2$ s cmHg], calculated as the flux ($n_i$) divided by the partial pressure difference between the membrane upstream and downstream ($\Delta p_i$), and multiplied by the thickness of the membrane (l).

$$P_i = \frac{n_i l}{\Delta p_i}$$

Another term, "permeance," is defined herein as productivity of membranes and is typically measured in Gas Permeation Units (GPU) (1 GPU=$10^{-6}$ [cm$^3$ (STP)]/[cm$^2$ s cmHg]), determined by dividing permeability by effective membrane separation layer thickness.

$$\left(\frac{P_i}{l}\right) = \frac{n_i}{\Delta p_i}$$

Finally, "selectivity" is defined herein as the ability of one gas's permeability through the membrane or permeance relative to the same property of another gas. It is measured as a unitless ratio.

$$\alpha_{i/j} = \frac{P_i}{P_j} = \frac{(P_i/l)}{(P_j/l)}$$

EXAMPLES

Examples 1-4

Carbon Membrane Formation

Two thin PVDC copolymer films of ~0.4 mil (~10 micron) thickness were melt-extruded using a commercial bubble extrusion process from two PVDC copolymer resins referred to as film 1 and 2. Film 1 was a PVDC polymer having 4.8 wt % methylacrylate comonomer and 5% dibutyl sebatate. Film 2 was a PVDC polymer having 17.6 wt % vinyl chloride comonomer. Commercially available PVDC textile was obtained from Asahi Kasei under the trade designation NF-711 (3-leaf twill, 0.05 mm*15 filament, 51% porosity).

The thin films and cloth were laminated using a ChemInstruments Inc. Hot Roll Laminator HL-101. These parameters were used for the lamination process: roll temperature 325° F. (162.8° C.), pressure 65 psig, roll speed 2.2 feet per minute.

One inch (25.4 mm) disks were cut out of the cloth+film laminate for carbonization. Twelve disks were treated in one batch following a two-step recipe: 1) For the initial low temperature pretreatment, 12 disks were sandwiched between honeycomb plates, through which HCl generated was transported out swiftly. The weight of each plate was about 0.1 kg. A scrubber connected to this oven contained a 10 wt % sodium hydroxide aqueous solution. A loaded oven was heated at 1° C./min to 130° C. and held for 24 hour under 2 L/min of air purge. 2) For the second heating step, the 12 pretreated disks were sandwiched between the honeycomb plates and loaded into a nitrogen purged 5.5" OD quartz tube furnace. A scrubber connected to this furnace contained a 10 wt % sodium hydroxide aqueous solution. The furnace was raised to a final temperature ranging from 500-800° C. (shown in Table 1) at a ramp rate of 3° C./min, and held for 30 minutes at the final temperature, then cooled down to room temperature (~25° C.). After cooling down, the carbon membranes were put into storage box continuously purged with dry nitrogen at a flow rate of 5 Liter/min.

Carbon Membrane Permeation Test

The supported carbon molecular sieve membranes were masked onto a standard 25 mm filter holder (Millipore #4502500, EMD Millipore Corp., Germany) using an impermeable aluminum tape, leaving open a defined permeation area. A two-part epoxy (J-B Weld twin tube) was then applied along the interface of the tape and the supported CMS membranes. Single gases were tested at 20° C. with a continuous feed at upstream (25 sccm, 1 atm) and He purge at downstream (2.0 sccm, 1 atm). The permeate carried by the He purge gas was analyzed by GC (gas chromatograph) with a TCD (thermal conductivity detector for $H_2$ and $CO_2$) and FID (flame ionization detector for $CH_4$). The concentrations in all cases were lower than 5%, so the gas flow rate in downstream was considered the same as the He flow rate. The permeate rate was calculated using the He purge flow rate times the permeate concentrations measured by GC. The order of testing was kept in the order of $H_2$, $CO_2$, and $CH_4$. The tests were run for several hours to days until the permeate concentrations were steady. The permeation results are shown in Table 1. From the results it is evident that the supported CMS membranes realize good separation of hydrogen from methane without causing defects or failures during the fabrication of the supported CMS membranes. The cross-section of Example 1 and top view are shown in Figures in 1 and 2.

TABLE 1

| Example | Film | Final pyrolysis temperature [° C.] | $H_2$ permeance [GPU] | $CO_2$ permeance [GPU] | $CH_4$ permeance [GPU] | $H_2/CH_4$ selectivity [-] |
|---|---|---|---|---|---|---|
| 1 | 1 | 500 | 180.7 | 40.03 | 0.43 | 459.0 |
| 2 | 1 | 650 | 139.7 | 45.13 | 0.660 | 211.7 |

TABLE 1-continued

| Example | Film | Final pyrolysis temperature [° C.] | $H_2$ permeance [GPU] | $CO_2$ permeance [GPU] | $CH_4$ permeance [GPU] | $H_2/CH_4$ selectivity [-] |
|---|---|---|---|---|---|---|
| 3 | 1 | 800 | 53.0 | 12.45 | 0.12 | 428.9 |
| 4 | 2 | 500 | 171.5 | 51.12 | 0.78 | 285.7 |

Examples 5-6

Carbon Membrane Formation

A polymer PVDC polymer having 4.8 wt % methylacrylate comonomer was dissolved in n-methylpyrrolidone at 60° C. to make a polymer solution at 30 wt % polymer loading. The polymer solution was then cooled down to 20° C. before casting. Commercially available PVDC textile was obtained from Asahi Kasei under the trade designation NF-711 (3-leaf twill, 0.05 mm*15 filament, 51% porosity). The polymer solution was poured and casted evenly onto the PVDC textile using a 4 mil (~100 micron) applicator. The textile coated with the polymer solution was left in air for ~10 seconds before dipping into a water bath at 20° C., where the "phase separation" of the polymer solution layer happens and "locks" this layer onto the substrate textile to make a polymer composite.

One inch (25.4 mm) disks were cut out of the polymer composite for carbonization. Twelve disks were treated in one batch following the two-step procedure as used for Examples 1-4 except that the final pyrolysis temperatures were 500° C. and 950° C. for Example 5 and 6 respectively. After cooling down, the carbon membranes were stored in dry nitrogen at a flow rate of 5 Liter/min.

Carbon Membrane Permeation Test

The supported carbon molecular sieve membranes were masked onto a standard 25 mm filter holder (Millipore #4502500, EMD Millipore Corp., Germany) using an impermeable aluminum tape, leaving open a defined permeation area. A two-part epoxy (J-B Weld twin tube) was then applied along the interface of the tape and the supported CMS membranes. Mixed gas permeation were tested at 20° C. with a continuous feed at upstream (1 atm) and He purge at downstream (2.0 sccm, 1 atm). The permeate carried by the He purge gas was analyzed by GC (gas chromatograph) with a TCD (thermal conductivity detector for $H_2$ and $CO_2$) and FID (flame ionization detector for all the hydrocarbons). The concentrations in all cases were lower than 5%, so the gas flow rate in downstream was considered the same as the He flow rate. The permeate rate was calculated using the He purge flow rate times the permeate concentrations measured by GC. Two gas mixtures were fed to the upstream of the membrane in the order of equimolar $H_2/CO_2/CH_4$ (total flow of 75 sccm) and equimolar $C_2H_4/C_2H_6/C_3H_6/C_3H_8$ (total flow rate of 60 sccm). The tests were run for several hours to days until the permeate concentrations were steady. The permeation results are shown in Table 1. From the results it is evident that the supported CMS membranes realize good separation of olefins from paraffins.

TABLE 2

| Gas permeance [GPU] | Example 5 | Example 6 |
|---|---|---|
| $H_2$ | 80.9 | 24.5 |
| $CO_2$ | 253.9 | 90.2 |
| $CH_4$ | 18.8 | 7.9 |
| $C_2H_4$ | 9.0 | 7.2 |
| $C_2H_6$ | 6.1 | 2.9 |
| $C_3H_6$ | 15.9 | 6.2 |
| $C_3H_8$ | 3.86 | 0.30 |
| $\alpha\ C_3H_6/C_3H_8$ | 4.1 | 20.5 |

What is claimed is:

1. A method of making a supported carbon molecular sieve membrane, the method comprising:
    (i) contacting a film of a carbon forming polymer with a polymer textile to form a laminate, the film and polymer textile being comprised of a polymer selected from the group consisting of a polyvinylidene chloride copolymer, polyimide, or combination thereof;
    (ii) heating the laminate to a carbonization temperature for a time under an atmosphere sufficient to carbonize the film and polymer textile to form the supported carbon molecular sieve membrane comprised of a separating carbon layer supported on a carbon textile layer.

2. The method of claim 1, wherein the carbon forming polymer of the film and the polymer upon heating undergo expansion and contraction at the same temperatures in the same manner.

3. The method of claim 1, wherein the contacting is comprised of heating to a laminating temperature that fuses a portion of the film to the textile, the laminating temperature being a temperature that does not carbonize the film and textile.

4. The method of claim 3, wherein the contacting is comprised of hot rolling the film to the textile.

5. The method of claim 3, wherein the separating carbon layer supported on the carbon textile layer are graphitically bonded after step (ii) where the film is fused to the textile.

6. The method of claim 1, wherein the carbon separating layer has a thickness of 0.01 micrometer to 15 micrometers.

7. The method of anyone of claim 6, wherein carbon separating layer has a thickness of 0.05 micrometer to 10 micrometers.

8. The method of claim 1, wherein the carbon forming polymer of the film and the textile is the polyvinylidene chloride copolymer.

9. The method of claim 8, wherein the polyvinylidene chloride copolymer has an amount of comonomer of 3% to 20% by weight of the polyvinylidene chloride copolymer.

10. The method of claim 9, wherein the comonomer is one or more of the following: a vinyl monomer; a vinyl chloride monomer; an acrylate monomer; a methacrylate monomer; a styrenic monomer; acrylonitrile, methacrylonitrile; itaconic acid; chlorotrifluoroethylene.

11. A supported carbon molecular sieve membrane made by the method of claim 1.

12. A process for separating a gas molecule from a gas feed comprised of the gas molecule and at least one other gas molecule, the method comprising:
  (i) providing a supported carbon molecular sieve membrane made by a method comprising:
    (a) contacting a film of a carbon forming polymer with a polymer textile to form a laminate, the film and polymer textile being comprised of a polymer selected from the group consisting of a polyvinylidene chloride copolymer, polyimide, or combination thereof; and
    (b) heating the laminate to a carbonization temperature for a time under an atmosphere sufficient to carbonize the film and polymer textile to form the supported carbon molecular sieve membrane comprised of a separating carbon layer supported on a carbon textile layer; and
  (ii) flowing the gas feed through said carbon molecular sieve membrane to produce a first stream having an increased concentration of the gas molecule and a second stream having an increased concentration of the other gas molecule.

13. A supported carbon molecular sieve membrane comprised of a laminate having a carbon separating layer graphitically bonded to a carbon textile, wherein the carbon separating layer is a continuous film.

14. The supported carbon molecular sieve membrane of claim 13, wherein the textile is a woven, knitted, crocheted, spread towed, braided, macramed, felted or combination thereof textile.

15. The supported carbon molecular sieve membrane of claim 14, wherein the textile is a woven textile.

* * * * *